Jan. 12, 1971 R. W. HEID, JR 3,554,568
PISTON AND PISTON RING COMBINATION
Filed Aug. 19, 1968

INVENTOR.
ROBERT W. HEID, JR.

BY
ATTORNEYS

# United States Patent Office 3,554,568
Patented Jan. 12, 1971

3,554,568
PISTON AND PISTON RING COMBINATION
Robert W. Heid, Jr., Richmond, Ind., assignor to Dana
Corporation, Toledo, Ohio, a corporation of Virginia
Filed Aug. 19, 1968, Ser. No. 753,370
Int. Cl. F02f 5/00; F16j 9/00
U.S. Cl. 277—170                                3 Claims

ABSTRACT OF THE DISCLOSURE

Disclosed herein is the combination of a wedge-shaped, pressure-backed piston ring and piston, with the ring located closely adjacent the upper end of the piston. The top land of the piston is relieved to allow the combustion gases to exert positive downward and outward pressure on the ring.

---

This invention relates to a piston and piston ring combination for use in internal combustion engines.

The primary function of a compression ring in an internal combustion engine is to provide an effective seal for the combustion gases (i.e., blow-by control). A secondary function of the compression ring is to prevent excess lubricating oil from reaching the combustion chamber (i.e., oil control). To provide an effective seal the compression ring must maintain positive contact with the cylinder wall and at the same time, positive contact with the ring groove of the piston.

Under normal operating conditions the compression ring, which is self-expansible, expands into sealing contact with the cylinder wall and is aided by the combustion gases which exert a radially outward force. The compression ring also seats on the top or bottom surface of the ring groove, forming a seal therewith. Under high speed conditions, there is a condition or effect known as "piston ring flutter" which is characterized by greatly increased blow-by. The exact cause or causes of this condition are not known, but it may be assumed because of the greatly increased blow-by that the seal between the ring and the groove, or between the ring and the cylinder wall, or between both, is broken as the ring vibrates axially or radially. Whether this is due to the ring becoming unseated because inertial forces acting on the ring exceed the downward forces acting on the ring, or due to the ring losing contact with the cylinder wall because of radial collapse is unknown. However, it has been found that the piston-piston ring combination of this invention greatly reduces, if not completely eliminates, this condition.

In the operation of a two-stroke cycle internal combustion engine, the top compression ring opens and closes the exhaust and intake ports. The piston land located above the top compression ring does not eflect the opening and closing of the ports, but restricts the flow of exhaust gases or intake mixtures through the ports after they have been unsealed by the top compression ring and thus reduces the effectiveness of two-stroke cycle internal combustion engines. While the advantages of locating the top compression ring closely adjacent the head of the piston have been recognized, it has been considered undesirable to do so for a number of reasons, a primary reason being that a piston ring so located is inherently closely adjacent the combustion chamber and is subject to carbon build-up because of partial combustion of the lubricant that is on the piston ring and between the piston ring and the ring groove. The piston-piston ring combination of this invention reduces, if not eliminates, this problem.

In conventional internal combustion engines there exists an air gap between the piston and cylinder wall, and extending from the combustion chamber to the first piston ring into which combustion gases enter. Because this air gap is relatively narrow compared to its length, during combustion of the gases the flame front is quenched by the relatively cold piston and cylinder wall surfaces, whereby this pocket of combustion gases remains unburnt, causing the engine to subsequently emit undesirable hydrocarbons. In the piston-piston ring combination of the present invention this problem is greatly reduced or avoided by eliminating the narrow gap and permitting the flame front to reach all the combustion gases.

Other objects and advantages of the present invention will become apparent from the following detailed description and drawings of the invention, wherein.

Figure 1:
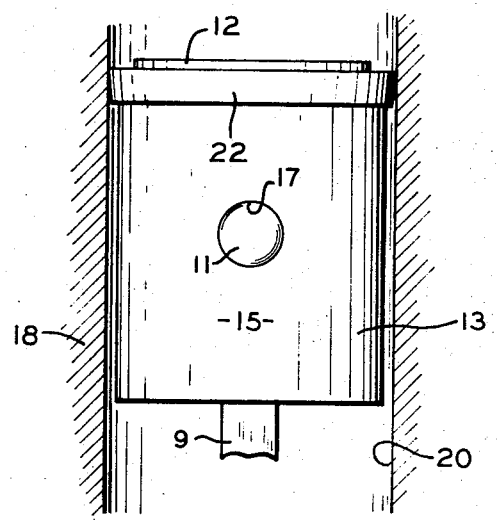
FIG. 1 is a side view showing the piston and piston ring of this invention in the environment of the cylinder of an internal combustion engine.

Referring to FIG. 1, there is shown the piston 15 and the piston ring 22 of this invention disposed in the cylinder 18 of a conventional internal combustion engine (not shown). Except for the ring groove and land area as herein described, the piston 15 of the present invention is of conventional construction and includes a skirt portion 13 and an upper end or head 12 which is adjacent the combustion chamber (not shown) of the engine. Further, it includes a bore 17 for receiving a wrist pin 11 which connects the piston 15 to a connecting rod 9.

Figure 2:
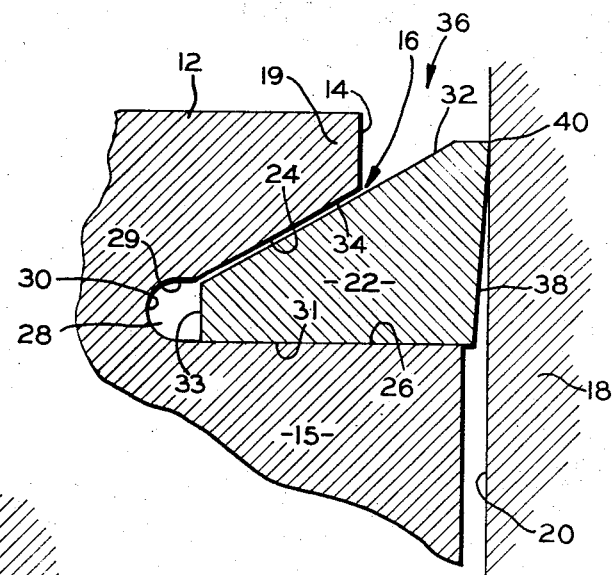
FIG. 2 is an enlarged partial cross-sectional view showing the piston and piston ring of the preferred embodiment of this invention in operative relationship to a cylinder wall; and, FIG. 3 is an enlarged, partial cross-sectional view showing the piston and piston ring of an alternate embodiment of this invention in operative relationship to a cylinder wall.

Referring to FIG. 2, there is shown an enlarged cross-sectional view of the upper corner of the piston 15 and ring 22 of the preferred embodiment of this invention. The piston 15 has a ring groove, designated generally by the numeral 16, which is adapted to receive the piston ring 22. The ring groove 16 has an upper sloping surface 24 that slopes downwardly in a radially inward direction and terminates at the radially inner wall 30 of the ring groove. The lower surface 26 of the ring groove is essentially normal to the axis of the piston and extends radially outwardly from the radially inner wall 30 which is generally arcuate.

The piston ring 22 is an annular ring formed of a conventional piston ring material, such as grey cast iron, and has a "gap" or split (not shown) in the conventional manner. The piston ring 22 is self-expansible and when compressed in its operative position within the cylinder it exerts a radial force on the wall 20 of the cylinder 18. The piston ring 22 may be described as being essentially rectagular in cross-section except for the inner and upper corner which is truncated to form a sloping surface 32 which has the same slope as the corresponding sloping surface 24 of the ring groove 16. The ring 22 further includes a lower or bottom surface 31, an inner peripheral surface 33, and an outer peripheral surface or face 38 which is tapered as herein described.

As shown in FIG. 2, the ring groove 16 and piston ring 22 are dimensioned so that when the piston ring 22 is in its normal operating position, i.e., seated on the bottom surface 26 of the ring groove and in peripheral contact with the cylinder wall 20, there exists an air gap 34 between the sloping surfaces 24 and 32 which communicates with the pocket 28 formed by inner radial walls 30 and 33 of the ring groove and piston ring, respectively. The inner radial walls 30 and 33 are dimensioned so that this pocket 28 exists at all times including when the piston ring is in its inner most position.

The land area 19 of the piston 15 which exists between its upper end 12 and the ring groove 16 is made with a reduced diameter relative to the main diameter of the piston, so as to expose a portion of the piston ring, including at least a portion of its sloping surface 32. The preferred included angle between the sloping surfaces 24 and 32 and the respective lower surfaces 26 and 31 of the ring groove and piston ring, is approximately 30 degrees. The diameter of the land area 19 is reduced sufficiently so that the axial width of the land 14 is equal to or less than the distance between the land 14 and the cylinder wall 18, thereby assuring that the gap 36 formed between the piston 15, ring 22 and cylinder 18 is as wide or wider than it is deep.

Figure 3:
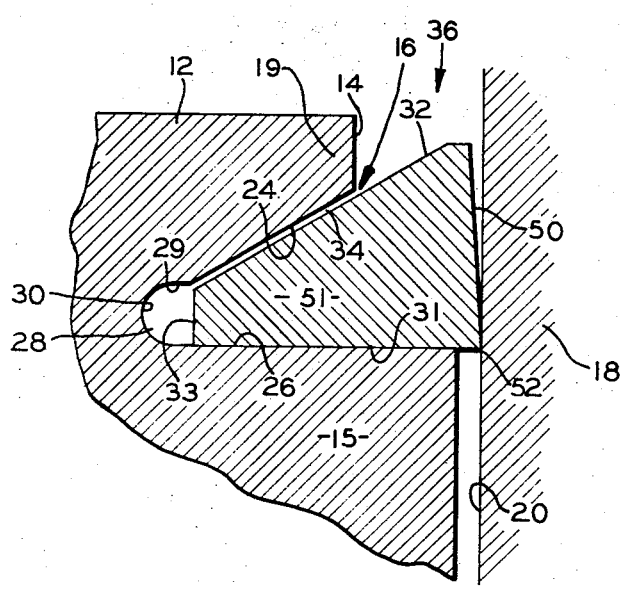

In the embodiment of FIG. 2 which is for a two-cycle internal combustion engine application, the outer peripheral or bearing surface 38 of the piston ring 22 is tapered radially inwardly in an axially downward direction to provide point contact at point 40 with the cylinder wall. This permits a higher sealing point which has been found to be desirable in two-cycle engine applications. The preferred angle of taper is approximately one degree. In the alternate embodiment of FIG. 3, which shows a piston ring 51 for use in a four-cycle internal combustion engine, the piston 15 is identical to that heretofore described and the piston ring 51 is identical to the piston ring 22, with the exception of the outer peripheral face 50. With this exception, the description given in regard to piston ring 22 applies to piston ring 51 and identical reference numerals have been used. The outer peripheral face 50 of piston ring 51 is tapered radially inward in an axially upward direction to provide point contact at point 52 between ring 51 and the cylinder wall 20. The term "point contact" as used herein refers to an area of increased unit pressure relaitve to the remainder of the peripheral face of the ring, rather than an actual point. The lower point contact of ring 51 accelerates break-in and provides a downward scraping action by the ring face which improves oil control.

Referring to FIG. 2, in the operation of the preferred embodiment of this invention, the piston ring 15 is normally seated on the bottom surface 26 of the ring groove 16 providing a seal therewith and is expanded into sealing engagement with the cylinder wall 20. The combustion gases acting on the piston ring 15 along the air gap 34 and pocket 28 exert radially outward and axially downward forces on the ring 51. In the event the piston ring 51 becomes unseated because of inertial forces a portion of its upper surface (between the land 14 and cylinder wall 20) is at all times exposed to the combustion gases which continue to exert a radially outward and axially downward force, thereby reducing or eliminating piston ring flutter. Since the gap 36 has a width equal or greater than its depth, the flame front will reach combustion gas in this area, thereby reducing undesirable emissions. The wedge-shaped construction provided by the sloping surfaces 24 and 32 gives self-cleaning action to the piston-piston ring combination of this invention. While the ring 22 bears against the cylinder wall 20, the piston 15 is capable of limited lateral movement because of inherent tolerances between the piston and the cylinder wall. This limited lateral movement of the piston causes relative lateral movement between the sloping surfaces 32 of the piston ring and the sloping surfaces 24 of the ring groove thereby reducing carbon build-up between the ring and ring groove and preventing the ring from sticking in the ring groove.

The operation of the piston ring 51 of the alternate embodiment is the same that was described in regard to the piston ring 22, except for the operation of the tapered outer peripheral face 50 which has been previously described.

It is understood, of course, that various details of construction may be modified through a wide range without departing from the principles of this invention, and it is not, therefore, intended to limit the patent granted hereon otherwise than necessitated by the scope of the appended claims.

I claim:

1. In combination, a piston and piston ring for use in the cylinder of a two-cycle internal combustion engine, said piston having adjacent its upper end an annular piston ring groove adapted to receive said piston ring, said groove having a downwardly and radially inwardly sloping upper surface terminating at a radially inner wall of said groove, said groove having a lower surface extending radially inwardly and terminating at said radial inner wall, the included angle between said upper and lower surfaces of said groove being acute, said ring being a self-expansible annular ring having a cross-section corresponding to the cross-section of said groove including an upper sloping surface of said ring corresponding to the sloping surface of said groove, said groove and ring being dimensioned so that when said ring is seated on the lower surface of said groove and in operative contact with said cylinder there exists an air gap between the respective sloping surfaces of said ring and groove and between the inner radial wall and the groove and the inner radial periphery of the ring, whereby combustion gases can exert a radially outward and axial downward force on the ring, said piston having a land area between its upper end and said groove, said land area having a sufficiently smaller diameter than the diameter of said ring to expose a portion of said ring including at least a portion of the sloping surface of said ring to the combustion gases whereby said gases will at all times act to force said ring radially outwardly and axially downwardly, the axial width of said land area being less than the distance between said land area and said cylinder, and the outer peripheral surface of said ring being tapered radially inwardly in an axially downward direction whereby initial contact between said ring and said cylinder is at the upper peripheral corner of said ring.

2. The piston and piston ring combination of claim 1, wherein the included angle between the sloping and lower surfaces of said groove is substantially 30 degrees.

3. In combination, a piston and piston ring for use in a two-cycle internal combustion engine, said piston having adjacent its upper end an annular piston ring groove adapted to receive said piston ring, said groove having a downwardly and radially inwardly sloping surface terminating at a radially inner wall of said groove, said groove having a lower surface extending inwardly and terminating at said radially inner wall, said ring being a self-expansible annular ring having a cross-section corresponding to the cross-section of said groove including an upper sloping surface corresponding to the sloping surface of said groove, said groove and ring being dimensioned so that when said ring is seated on the lower surface of said groove there exists an air gap between the remaining adjacent surfaces of said ring and said groove, said piston having the land area between its upper end and said groove relieved to leave exposed to combustion gases a portion of said ring including a portion of the upper sloping surface of said ring, said ring extending axially beyond the termination of said groove and having its outer peripheral surface tapered radially inwardly in an axially downward direction to provide initial contact between said ring and said cylinder at the upper peripheral corner of said ring and closely adjacent the upper end of said piston.

References Cited
UNITED STATES PATENTS

| | | | |
|---|---|---|---|
| 1,370,877 | 3/1921 | Challis | 277—172 |
| 1,862,983 | 6/1932 | Roberts | 277—172 |
| 2,652,298 | 9/1953 | Estey | 277—173 |
| 2,715,555 | 8/1955 | Marien | 277—173 |

FOREIGN PATENTS

| | | | |
|---|---|---|---|
| 1,082,513 | 6/1954 | France | 277—170 |

SAMUEL D. ROTHBERG, Primary Examiner

U.S. Cl. X.R.

272—173; 92—172